United States Patent [19]

Inaba et al.

[11] Patent Number: 4,838,652

[45] Date of Patent: Jun. 13, 1989

[54] IMAGE FORMING APPARATUS

[75] Inventors: Yutaka Inaba, Kawaguchi; Yasuyuki Tamura, Yokohama, both of Japan

[73] Assignee: Canon Kabushiki Kaisha, Tokyo, Japan

[21] Appl. No.: 862,980

[22] Filed: May 14, 1986

[30] Foreign Application Priority Data

May 15, 1985 [JP] Japan ................................ 60-101589
Sep. 10, 1985 [JP] Japan ................................ 60-199929

[51] Int. Cl.$^4$ ........................ G02F 1/13; G03G 15/00
[52] U.S. Cl. ................................ 350/331 R; 350/332; 350/336; 350/350 S; 350/346; 346/160
[58] Field of Search .................... 350/350 S, 332, 333, 350/334, 346, 339 R; 346/160; 358/298; 340/784, 805; 377/57; 357/23.7

[56] References Cited

U.S. PATENT DOCUMENTS

| | | | |
|---|---|---|---|
| 3,840,695 | 10/1974 | Fischer | 350/339 R |
| 4,386,836 | 6/1983 | Aoki et al. | 350/346 |
| 4,393,380 | 7/1983 | Hojokawa et al. | 350/334 |
| 4,548,476 | 10/1985 | Kaneko | 350/350 S |
| 4,569,574 | 2/1986 | Masaki et al. | 350/333 |
| 4,581,619 | 4/1986 | Mizutome et al. | 346/160 |
| 4,591,886 | 5/1986 | Umeda et al. | 350/356 |
| 4,636,817 | 1/1987 | Masaki | 346/160 |
| 4,728,972 | 3/1988 | Stephany et al. | 346/160 |

FOREIGN PATENT DOCUMENTS 0081621  5/1984  Japan ................................ 350/333

OTHER PUBLICATIONS

F. L. J. Sangster–"The Bucket-Brigade . . . Analogue Signals", pp. 97–110–Philips Tech. Review–vol. 31, No. 4–1970.
K. Suzuki–"A 220x240 . . . Liquid Crystal Display", pp. 11–16–Proceedings of the SID, vol. 25/1, 1984.

Primary Examiner—Stanley D. Miller
Assistant Examiner—Tai V. Duong
Attorney, Agent, or Firm—Fitzpatrick, Cella, Harper & Scinto

[57] ABSTRACT

An image forming apparatus having a light source, a photosensitive member and an array of rows and columns of microshutters thereinbetween for modulating the light source corresponding to information signals applied in parallel to at least one of the rows of microshutters and transferred in parallel to a subsequent row of microshutters.

39 Claims, 10 Drawing Sheets

IMAGE FORMING APPARATUS

FIELD OF THE INVENTION AND RELATED ART

The present invention relates to an image forming apparatus, particularly an image forming apparatus using a liquid crystal-optical shutter array.

In recent years, there have been several proposals for a so-called "liquid crystal-optical shutter array" wherein the electro-optical modulation function of a liquid crystal (hereinafter sometimes abbreviated as "LC") is utilized, and light is irradiated to LC-modulation cells as microshutters arranged in the form of an array, so that selectively transmitted light is provided to a photosensitive member as light image signals. Such LC-optical shutter arrays are disclosed in, e.g., U.S. Pat. No. 4548476 to Kaneko and U.S. Pat. No. 4569574 to Masaki et al.

In image forming apparatuses of the electrostatic recording system using such an LC-optical shutter array, as light emitted from a light source is generally passed through polarizers, a liquid crystal cell and lenses to reach a photosensitive member, a considerable portion of the initial light leaks or is attenuated in the course so that the light reaching the photosensitive member can be so weak as to produce of inferior quality of images. In order to obviate this defect, a high luminescence light source or a photosensitive member with a high sensitivity is required, so that there arises another problem of high production cost.

SUMMARY OF THE INVENTION

An object of the present invention is to solve the above mentioned problems and provide an image forming apparatus of a good image quality using a liquid crystal-optical shutter at a low production cost without requiring a high luminescent light source or a high sensitivity photosensitive member.

According to the present invention, there is provided an image forming apparatus, comprising a light source, a photosensitive member and a shutter array disposed between the light source and the photosensitive member and comprising microshutters arranged in a plurality of rows and a plurality of columns so that light rays emitted from the light source are switched or modulated by the action of the microshutters corresponding to an information signal to provide an optical signal to be irradiated onto the photosensitive member. The image forming apparatus further comprises means for applying information signals to at least one row of microshutters among the plurality of rows and transfer means for transferring the information signals to a subsequent row of microshutters.

These and other objects, features and advantages of the present invention will become more apparent upon a consideration of the following description of the preferred embodiments of the present invention taken in conjunction with the accompanying drawings.

DETAILED DESCRIPTION OF PREFERRED EMBODIMENTS

Figure 1:
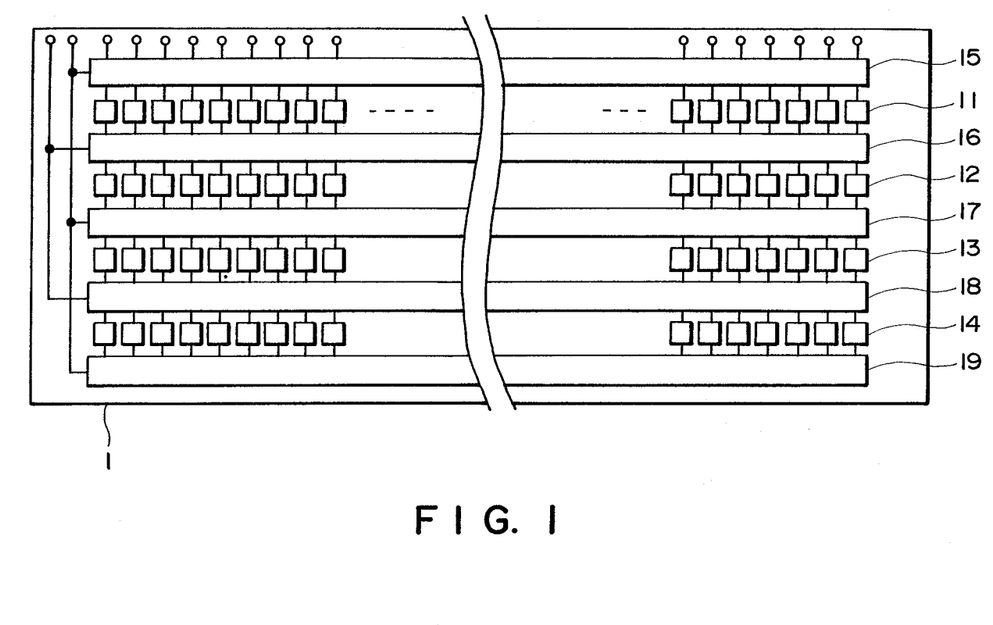
FIG. 1 is a partially cut-off schematic illustration of a liquid crystal-optical shutter panel used in an embodiment of the present invention.

FIG. 1 schematically shows an arrangement of an example of a liquid crystal (hereinafter abbreviated as "LC") optical shutter panel used in the present invention. Referring to FIG. 1, an LC-optical shutter panel 1 is composed of 4 rows of LC-microshutter arrays 11-14, a driving circuit 15 and transfer circuits 16-19. The LC-microshutter arrays 11-14 respectively have the same number of microshutters which are arranged in the same pitch. External signals are supplied to the driving circuit 15, by which the first row of microshutters 11 are opened or closed. The transfer circuits 16-19 have functions of transferring the image signals of the first row of microshutters 11 sequentially to the second and subsequent rows of LC-microshutters 12-14.

Figure 2:
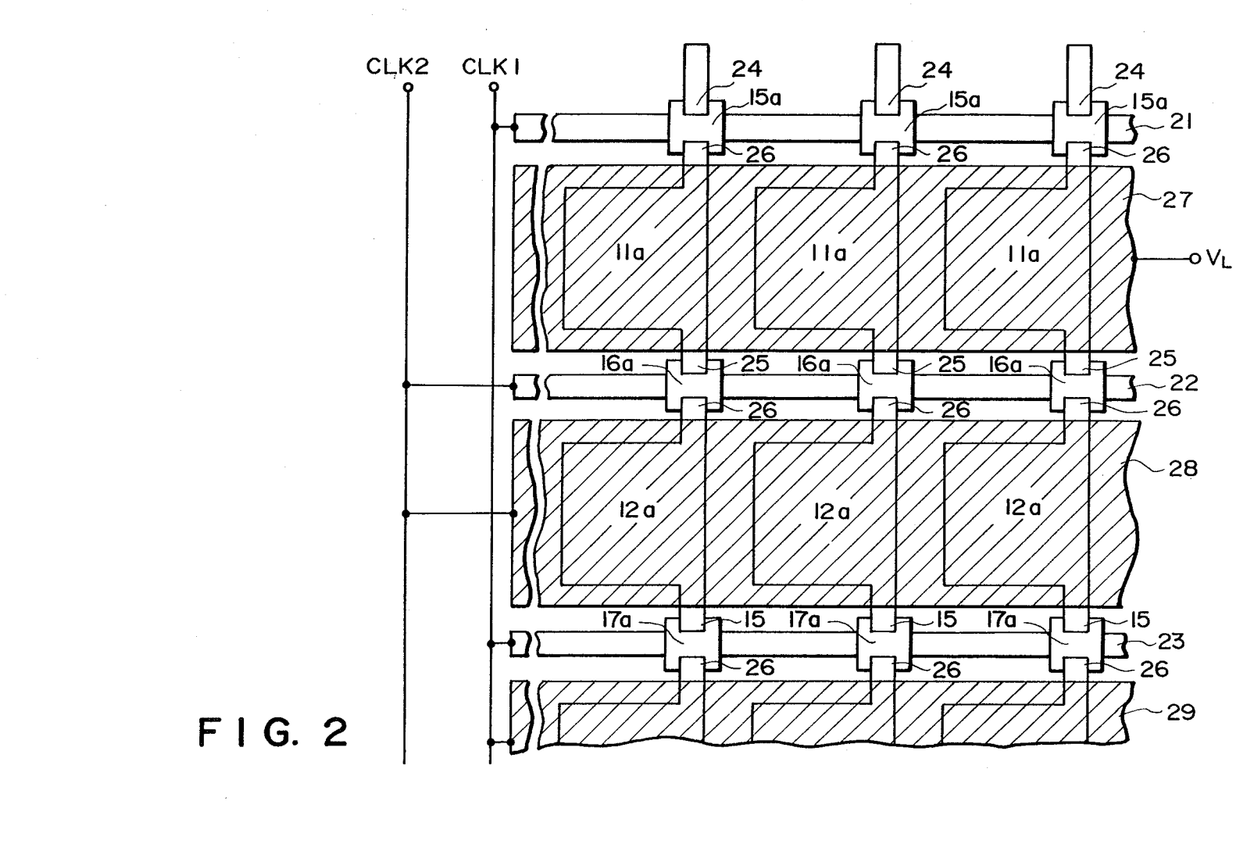
FIG. 2 is a plan view showing a liquid crystal cell and a TFT (thin film transistor) pattern.

The driving circuit 15 and transfer circuits 16-19 may be formed of TFT (thin film transistor)s on the same substrate as the LC-microshutters. FIG. 2 is a partial plan view showing an example of such a TFT pattern, and FIG. 3 is an equivalent circuit diagram thereof.

Figure 3:
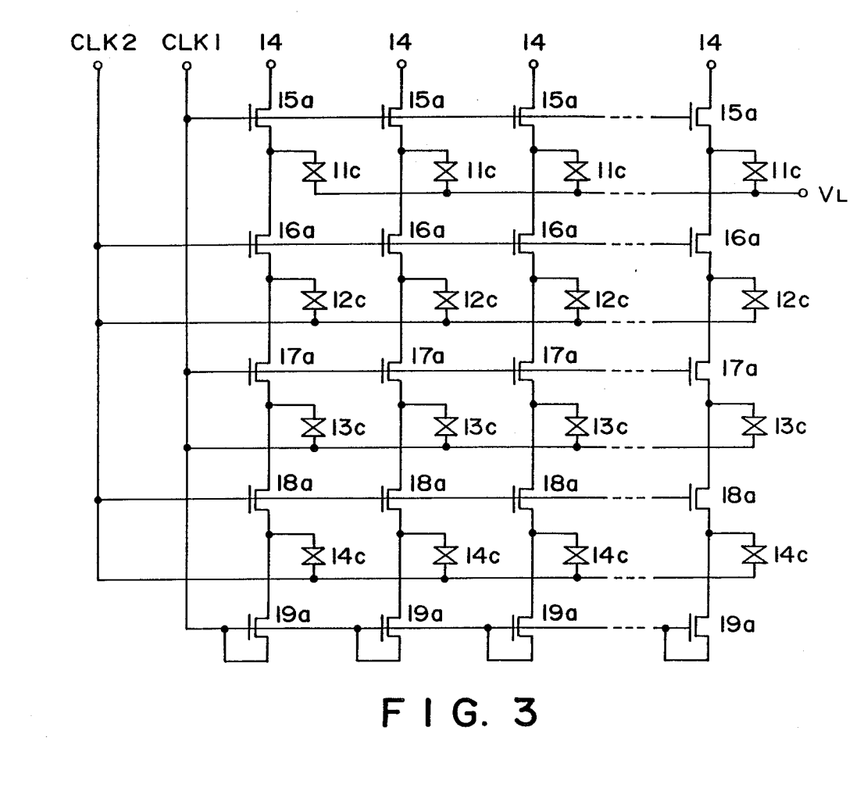
FIG. 3 is an equivalent circuit diagram thereof.

Referring to FIGS. 2 and 3, TFTs 15a, 16a, constituting the driving circuit 15 and transfer circuits 16, 17, . . . are superposed on the microshutter electrodes 11a, 12a, . . . of the microshutter arrays 11-14, and connected in common to the same gate signal lines 21, 22, 23, . . . on the respective rows. Image signals are supplied to the driving circuit 15 through signal input terminals 24. The TFTs 15a, 16a, 17a, . . . constituting the driving circuit 15 and the transfer circuits 16, 17, . . . comprise source electrodes 25 and drain electrodes 26 connected to the microshutter electrodes 11a, 12a, . . . , wherein the source electrodes 25 are connected to signal supplying electrodes and the drain electrodes 26 are connected to signal receiving electrodes. As a result, image signals supplied to the driving circuit 15 are successively transferred to the microshutter electrodes 11a, the transfer circuit 16, the microshutter electrodes 12a, the transfer circuit 17, . . . A liquid crystal is filled between the microshutter electrodes 11a, 12a, . . . and the counter electrodes 27, 28, . . . and shows a function of modulating the light transmitted therethrough depending on voltages applied between the pairing electrodes 11a and 27, 12a and 28, . . . Gate signal lines 21, 22, 23, . . . have a function of synchronizing the modulation of the liquid crystal with external clock pulses. Among the gate signal lines, the odd-numbered ones are connected to a first clock pulse signal line CLK1, and the even-numbered ones are connected to a second clock pulse signal line CLK2. On the other hand, among the counter electrodes 27, 28, 29, . . . ; one on the first row is connected to a constant-voltage source $V_L$, and among those on the second and subsequent rows, ones on the odd-numbered rows are connected to the first clock pulse signal line CLK1 and ones on the even-numbered rows are connected to the second clock pulse signal line CLK2.

Figure 4:
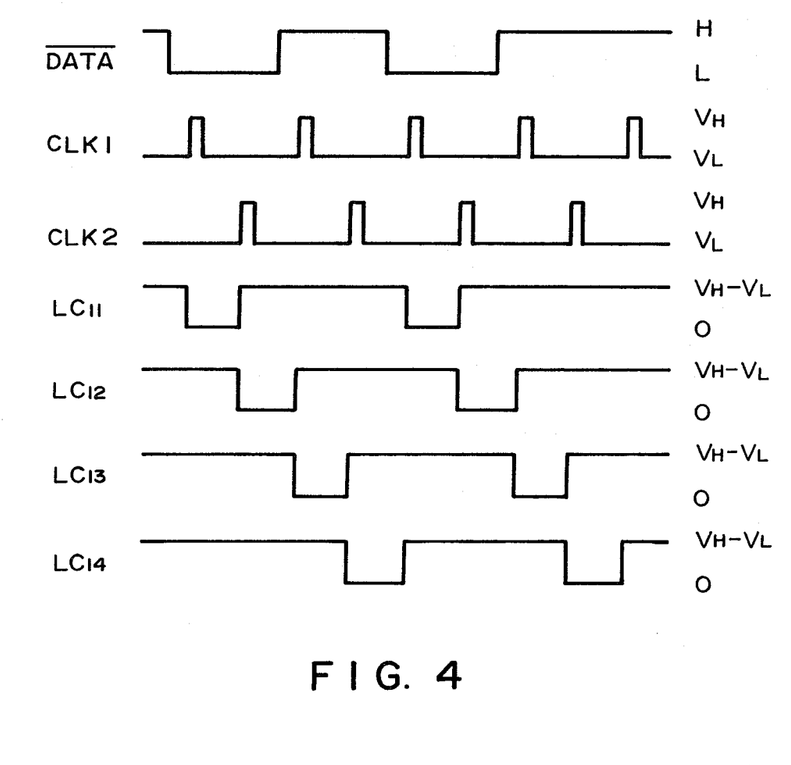
FIG. 4 is a pulse timing chart for the circuit.

FIG. 4 is a timing chart showing the timing and voltages of the respective signals applied to the above-mentioned circuit. It is assumed that a microshutter is "closed" to provide a "dark" state under application of a voltage and is "open" to provide a "bright" state under zero volt. As input image signals $\overline{DATA}$, an L level signal (open signal) is applied and then an H level signal (close signal) is applied. During this period, clock pulses CLK1 and CLK2 are respectively applied for two cycles. A high voltage level $V_H$ and a low voltage level $V_L$ of the clock signals are the same as the voltage levels of the image signals.

Then, operation according to this embodiment will be explained with reference to FIGS. 3 and 4. It is assumed that the LC-microshutters are all placed in the "closed" state at the initial stage. As LC-microshutters are electrically equivalent to capacitances, it is assumed that all the LC-microshutters are placed in the charged states at the initial stage.

Image signals ($\overline{DATA}$) supplied to the input signal terminal 24 are applied to a first row of LC-microshutter array 11 ($LC_{11}$), when the clock pulse CLK1 is at the high voltage level $V_H$ to turn on the TFT 15a in the driving circuit 15. When an image signal ($\overline{DATA}$) is H, the LC-microshutter is "closed". When the $\overline{DATA}$ is L, the LC-microshutter is "open". The clock pulse signal CLK11 soon returns to the low voltage level $V_L$ to turn off the TFT 15a in the driving circuit 15, whereas the states of "closed" or "open" are maintained because of the charge stored at the LC-microshutters 11 ($LC_{11}$). Then, when the clock pulse signal 2 is at the high voltage level $V_H$, the second row of TFTs 16a are turned on. If a certain microshutter 11 among those on the first row is in the "open" state, a charge flows from a corresponding microshutter 12 on the second row into the microshutter 11 on the first row, so that the microshutter 11 is driven to the "closed" state and the corresponding microshutter 12 on the second row is placed at the zero level to be inverted to the "open" state. In contrast thereto, if a certain microshutter 11 on the first row has been in the "closed" state, it is already in the charged state so that no charge flows thereinto from a corresponding microshutter 12 on the second row. As a result, if the microshutter 11 on the first row is "closed", the corresponding microshutter 12 on the second row is also in the closed state. In this way, image signals ($\overline{DATA}$) are transferred from the first row of microshutters 11 to the second row of microshutters 12. Thereafter, the clock pulse signal CLK2 is returned to $V_L$, whereby the data transfer is completed.

Further, when the CLK1 is again at the $V_H$ level, the "open" and "closed" states of the microshutters 12 on the second row are transferred to the microshutters 13 on the third line, all the microshutters 12 on the second row are placed in the "closed" state, and the microshutters 13 on the third row retain the image signals. At this time, the TFTs 15a on the first row, i.e., those in the driving circuit 15, are also turned on, subsequent image signals ($\overline{DATA}$) are supplied to the microshutters 11 on the first row through the signal input terminals 24. In this way, by using two phases of clock pulses CLK1 and CLK2 and alternately bringing them to a high voltage level $V_H$, image signals ($\overline{DATA}$) are successively transferred from the first row of microshutters 11 to those on the second row, the third row, . . . , and subsequent image signals ($\overline{DATA}$) run after the preceding image signals with one intermediate row. A device using this scheme is known as a BBD (bucket-brigade device) which was first proposed by F. L. J. Sangster, "Philips Tech. Review" No. 31, pp. 97-110 (1970). The present invention provides a transfer system comprising an LC-microshutter array and TFTs for transferring image signals based on the BBD scheme.

Figure 10:
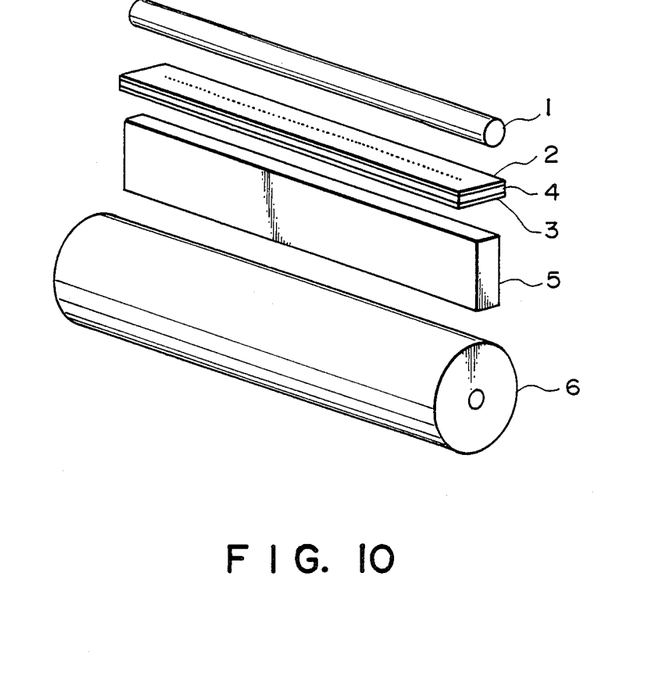
FIG. 10 is a perspective view schematically illustrating an arrangement of an image forming apparatus.

FIG. 10 shows a schematic arrangement of an example of an image forming apparatus using an LC-optical shutter array. Referring to the figure, the image forming apparatus is roughly composed of a linear light source 1 such as a fluorescent lamp, a pair of polarizers 2 and 3, an LC-optical shutter panel 4 comprising an LC-microshutter array interposed between the polarizers 2 and 3, a lens array 5, and a photosensitive drum 6. Accessories such as a charger are omitted from the figure. Light emitted from the source 1 passes through a modulation system comprising the polarizers 2 and 3 and the shutter panel 4, collected by the lens array 5, and irradiated onto the photosensitive drum 6. An electrostatic recording apparatus like this has several advantages such as easiness of realizing a small apparatus and absence of mechanically moving parts to provide less noise.

Now, light signals generated from the LC-microshutter array 4 are focused on the photosensitive member 6 by means of the lens array 5, and the photosensitive member 6 is rotated in synchronism with the speed of data transfer on the LC-microshutters. The photosensitive member 6 is exposed to light for a longer period of time compared with a case wherein it is instantaneously exposed through a single line of LC-microshutters, so that a sufficient amount of exposure is ensured even at a low intensity of illumination. In a case where 4 rows of LC-microshutters are used as in this embodiment, the average amount of exposure (illumination X time) on the overall photosensitive member is twice as much as that in the case where a single row of microshutters are used.

Figure 5:
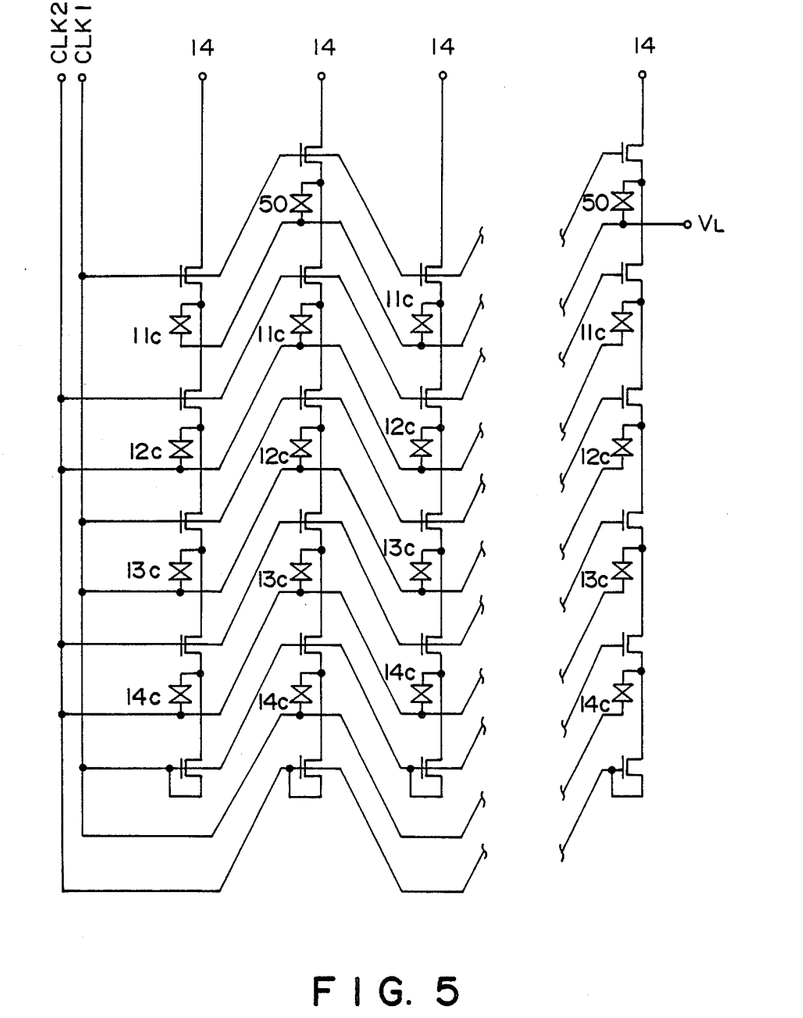
FIGS. 5, 7 and 8 respectively show an equivalent circuit according to another embodiment of the present invention.

FIG. 5 is a partial circuit diagram showing another data transfer circuit for the above-mentioned embodiment. Referring to FIG. 5, microshutters in the even-numbered columns are shifted to above by one row, and on the last row, one additional set of an LC-microshutter and a TFT is provided for each even-numbered column. The LC-microshutters 50 disposed projecting above are dummy microshutters, which accumulate charges but do not transmit light. According to this arrangement, transfer of image data is carried out alternately between even-numbered bits (microshutters) and odd-numbered bits (microshutters) to provide a checkered pattern on the photosensitive member.

Figure 6A:
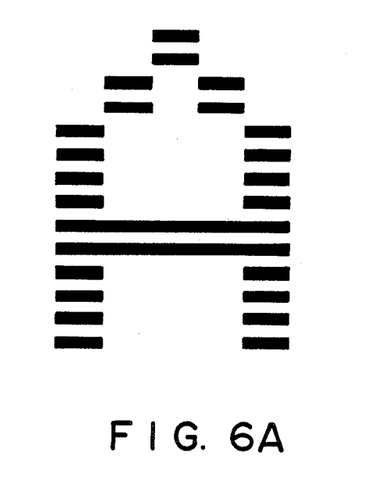
FIGS. 6A and 6B show samples of recorded images.
Figure 6B:
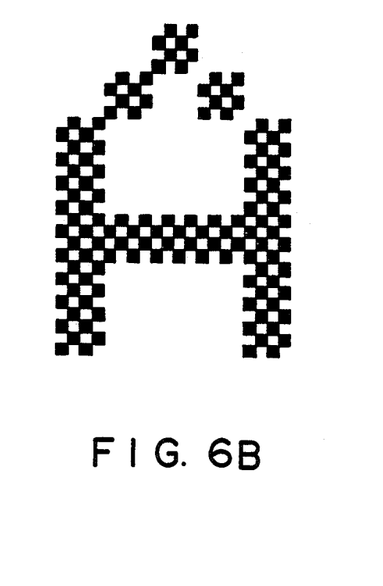

FIGS. 6A and 6B illustrate recorded image samples, wherein FIG. 6A shows an image obtained by using an LC-microshutter array shown in FIG. 3 and FIG. 6B shows an image obtained by using an LC-microshutter shown in FIG. 5 wherein even-numbered column bits are shifted upward by one row. In the example shown in FIG. 6A which has been obtained by using a system wherein image signals are transferred between alternate rows of microshutters, one being supplied with image signals and the other being not supplied with image signals, there is obtained an image including streaks of non-recorded portions which have not been exposed to light. On the other hand, in the example shown in FIG. 6B, streak-like non-recorded portions do not appear because image signals are distributed to the respective rows, whereby the image quality is apparently improved compared with the one shown in FIG. 6A.

Further, if the lens array 5 is disposed so as to provide focuses not right on the surface of the photosensitive member 6 but somewhat behind or in front of the surface, non-recorded portions are also exposed to some portions of light to weaken the contrast between the recorded portions and non-recorded portions, whereby an easier-to-see image can be obtained.

In the above embodiments, the voltages of $V_H$-$V_L$ or zero volt are applied to the LC-microshutters. The above embodiments may suitably be applied to twisted-nematic type or birefringence type liquid crystal devices as the "open" and "closed" states are switched by application or non-application of a voltage. However, for a device like a ferroelectric liquid crystal device wherein the "open" and "closed" states are formed by application of mutually opposite polarities of voltages, it is necessary to apply both positive and negative polarities of voltages. An embodiment for this purpose is shown in FIG. 7.

Figure 7:
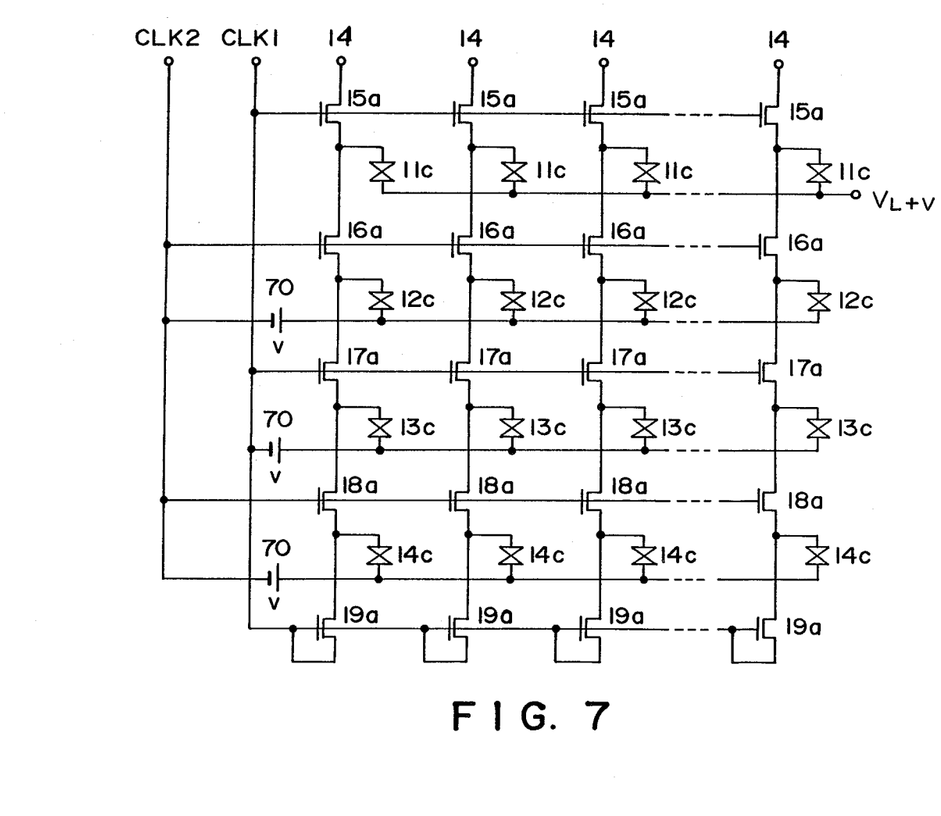

FIG. 7 shows an equivalent circuit diagram of another example of LC-shutter array for practicing the present invention. The LC-shutter array shown in FIG. 7 is obtained by modifying the one shown in FIG. 3. More specifically, the counter electrodes of the respective microshutters are not directly connected to the TFT gate signal lines but connected through a DC bias source 70.

If the voltage of the DC bias source 70 is denoted by V, the input signal levels by $V_H$ and $V_L$, and the counter electrode voltage for the first row of microshutters is set to $V_L+V$, the voltage applied to the liquid crystal are $V_H-V_L-V$ and $-V$. Thus, if the V is set to an appropriate level, both positive and negative polarity of application voltages may be obtained.

In the operation of the above mentioned apparatus including transfer means, if charge can be transferred completely (100%) without alternation, it is possible to increase the number of transferring the information signals to infinity. In the actual operation, however, the transfer efficiency is below 100%, because the internal resistance of an FET (field effect transistor) such as a TFT is not zero. Further, as leakage of charge occurs because the liquid crystal has some conductivity, so that charge is ordinarily attenuated in several transfers. Especially when picture elements are arranged in a high density, a unit microshutter has a smaller area and a smaller capacitance, so that the amount of signal charge also becomes small and even a small leakage can result in a lower of signal-to-noise ratio (i.e., the contrast between the "open" and "closed" states of the shutters). For example, if the picture element density is assumed to be 10 pels/mm, the area of a unit LC-microshutter is $100 \times 100$ $\mu$m at the most to provide a capacitance an the order of 0.1 pF according to the ordinary arrangement. On the other hand, as the resistivity of the liquid crystal layer is on the order of to $10^{10}$ to $10^{11}$ $\Omega$, charge is attenuated in several milliseconds.

Figure 8:
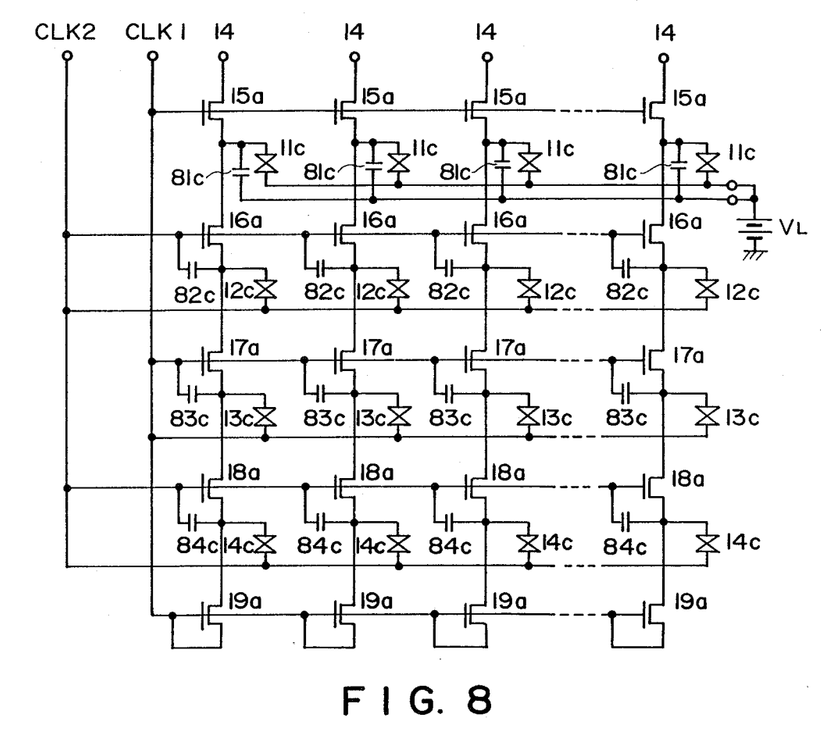

Accordingly, in a preferred embodiment according to the present invention, a new capacitor may be added to each microshutter in parallel with a capacitor provided by a liquid crystal layer to increase the signal charge and decrease the influence of the charge leakage. FIG. 8 shows an example for this purpose. More specifically, in the embodiment shown in FIG. 8, additional capacitors 81C-84C are provided to respective microshutters in parallel with capacitors 11C to 14C due to a liquid crystal.

FIGS. 9A to 9E are sectional views schematically showing steps for producing a liquid crystal device used in the apparatus according to the present invention.

Figure 9A:
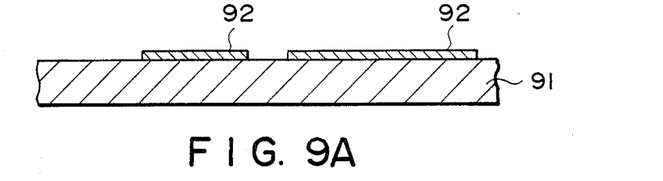
FIGS. 9A to 9E are sectional views showing steps for producing a liquid crystal device used in the apparatus according to the present invention.
Figure 9B:
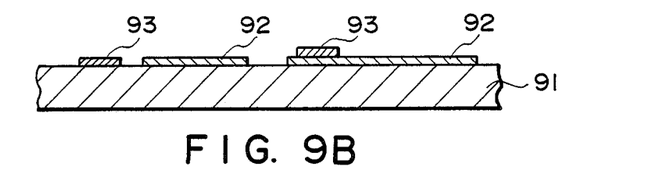
Figure 9C:
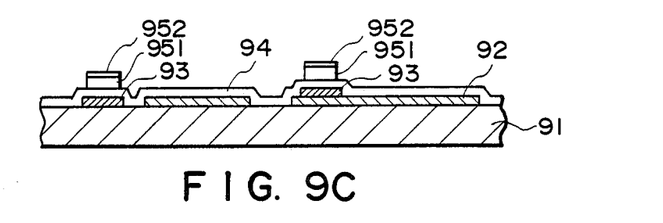
Figure 9D:
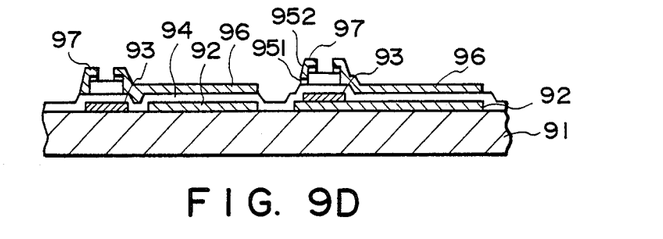
Figure 9E:
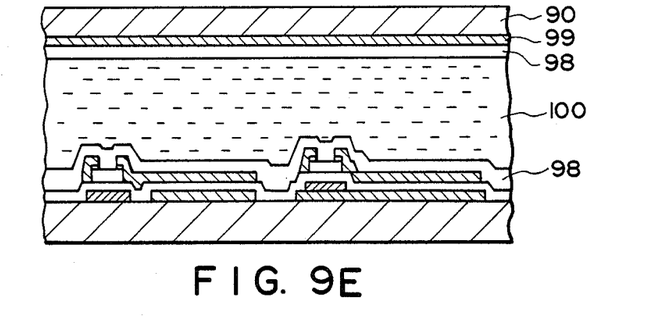

More specifically, on a glass substrate 91 is formed a first electrode film 92 of ITO (indium-tin-oxide), which is then patterned, as shown in FIG. 9A; then a metal strip 93 serving as a gate signal line is formed as shown in FIG. 9B; an insulating film 94 of amorphous silicon nitride, and a thin film semiconductor layer 951 and an n+ layer 952 of amorphous silicon and polysilicon are formed in laminated form, and the layers 951 and 952 are patterned (FIG. 9C); a second ITO film 96 serving as a shutter electrode of a microshutter and a metal strip 97 serving as a source line are respectively formed in pattern (FIG. 9D); and a counter electrode 99 and an orientation controlling film 98 provided with a uniaxial orientation axis having an effect of orienting liquid crystal molecules in one direction are formed on a counter substrate 90, which is then superposed with a TFT substrate as shown in FIG. 9D to provide a cell, into which is further injected a liquid crystal 100 to produce a device (FIG. 9E).

The capacitors 81-84 may be formed by the ITO film 92, the ITO film 96 serving as a shutter electrode and also as the capacitor counter electrode, and the insulating film 94. The additional capacitors have substantially the same area as the shutter area but can provide a sufficiently large capacitance compared with the liquid crystal layer as the spacing between the electrodes is ordinarily several thousand Å which is equal to the insulating film thickness. For example, in a case where a shutter area is $100 \times 100$ $\mu$m$^2$, an insulating film of amorphous silicon nitride having a relative dielectric constant of 6 is formed in a thickness of 0.3 $\mu$m, and a liquid crystal layer is formed of ZLI-1252 (available from Merck Co.) having a relative dielectric constant ($\epsilon$en) of 21 in a thickness of 10 $\mu$m, the capacitance of the insulating film is 1.8 pF and the capacitance of the liquid crystal layer is 0.2 pF to provide a total capacitance of 2.0 pF available for storing signal charge. Thus, by providing additional capacitors 81C to 84C; a signal charge in an amount of ten times becomes available.

Another advantage of this embodiment is that the above mentioned first ITO film 92 is disposed in parallel with the gate metal strips 93 so that the resistivities of the gate signal lines for the TFTs 16a to 19a on the second and subsequent rows can be lowered. If the first ITO film is not provided, the gate signal lines are constituted of only the metal strips. However, as the metal strips run between the picture elements, they cannot be wide. As a result, the gate lines have a large resistance and delay of gate signal cannot be ignored. More specifically, among TFTs on a row having a common gate line, it is possible that a TFT close to the gate signal source and a TFT remote from the source receive gate signals at different instants. This is not desirable for producing an LC-shutter having a large number of picture elements or a long LC-shutter. In this embodiment, when an ITO film is disposed in parallel with a gate signal line, this problem is alleviated.

As described hereinabove, according to the present invention, microshutters are arranged in a plurality of row and image signals are successively transferred to subsequent rows while moving a photosensitive member in correspondence with the transfer speed, whereby a sufficient amount of light exposure is accomplished even at a low intensity of illumination. As a transfer circuit for this purpose, a combination of an LC-shutter array and TFTs formed on the same substrate is used to transfer image signals based on the BBD scheme, so that an image forming apparatus may be constituted with a simple circuit, at a low production cost and without requiring a high intensity illumination source or a high sensitivity photosensitive member. Further, by alternately effecting image signal transfer bit-by-bit or deviating the focus of a lens array, an improved image quality may be obtained. Thus, according to the present invention, an image forming apparatus with a good image quality is provided at a low cost without requiring a high intensity illumination source or a high sensitivity photosensitive member. Furthermore, the charge transfer efficiency may be improved, and the resistance through gate signal lines can be decreased, so that the gate signal delay time can be shortened.

What is claimed is:

1. In an image forming apparatus comprising a light source, a photosensitive member, and a shutter array disposed between the light source and the photosensitive member comprising microshutters arranged in a plurality of rows and a plurality of columns so that light rays emitted from the light source are switched by the action of the microshutters corresponding to an information signal so as to provide an optical signal to be irradiated onto the photosensitive member; the improvement comprising means for applying information signals in parallel to at least one row of microshutters among the plurality of rows, transfer means for transferring the information signals in parallel to a subsequent row of microshutters and means for moving the photosensitive member in synchronism with the rate of the successive transfer of the information signals.

2. An image forming apparatus according to claim 1, wherein said transfer means comprises a circuit formed of a bucket brigade device.

3. An image forming apparatus according to claim 1, wherein the microshutters on each row are respectively connected to a thin film transistor, and a pair of microshutters belonging to neighboring rows are connected to the drain and the source, respectively, of a thin film transistor.

4. An image forming apparatus according to claim 1, wherein each microshutter comprises a pair of opposite electrodes and a liquid crystal disposed therebetween.

5. An image forming apparatus according to claim 4, wherein said liquid crystal is a twisted nematic liquid crystal.

6. An image forming apparatus according to claim 4, wherein said liquid crystal is a birefringence mode liquid crystal.

7. An image forming apparatus according to claim 4, wherein said liquid crystal is a ferroelectric liquid crystal.

8. An image forming apparatus according to claim 1, wherein said means for applying information signals includes a driving circuit comprising thin film transistors each connected to one microshutter on the first row through the drain thereof; said transfer means includes a transfer circuit comprising thin film transistors each connected to a pair or microshutters belonging to neighboring rows through the source and the drain thereof; and the image forming apparatus further comprises a bias circuit for applying a bias voltage to the counter electrode of a microshutter.

9. In an image forming apparatus comprising a light source, a photosensitive member, and a shutter array disposed between the light source and the photosensitive member and comprising microshutters arranged in a plurality of rows and a plurality of columns so that light rays emitted from the light source are switched by the action of the microshutters corresponding to an information signal so as to provide an optical signal to be irradiated onto the photosensitive member; the improvement comprising a driving circuit for supplying information signals in parallel to a first row among said plurality of rows of microshutters, transfer means for successively transferring the information signals in parallel to a second, a third,...and an n-th row of microshutters, and means for moving the photosensitive member in synchronism with the rate of the successive transfer of the information signals.

10. An image forming apparatus according to claim 9, wherein said driving circuit comprises thin film transistors each connected to one microshutter on the first row through the drain thereof.

11. An image forming apparatus according to claim 9, wherein said driving circuit comprises thin film transistors each connected to one microshutter on the first row through the drain thereof, the microshutters on each of the other rows are respectively connected to a thin film transistor, and a pair of microshutters belonging to neighboring rows are connected to the drain and the source, respectively, of a thin film transistor.

12. An image forming apparatus according to claim 9, wherein said driving circuit comprises driving thin film transistors each connected to one microshutter on the first row through the drain thereof, the microshutters on each of the other rows are respectively connected to a transfer thin film transistor, and a pair of microshutters belonging to neighboring rows are connected to the drain and the source, respectively, of a transfer thin film transistor; said image forming apparatus further comprising means for supplying a first clock pulse commonly to the gates of the driving thin film transistors and the transfer thin film transistors on an odd-numbered row and means for supplying a second clock pulse commonly to the gates of the transfer thin film transistors on an even-numbered row.

13. An image forming apparatus according to claim 9, wherein the microshutters on a row are charged in advance and then information signals are transferred to the microshutters on the row for writing in the row.

14. An image forming apparatus according to claim 9, wherein said driving thin film transistors and the transfer thin film transistors on an odd-numbered row are driven in synchronism with each other.

15. An image forming apparatus according to claim 9, wherein each microshutter comprises a pair of opposite electrodes and a liquid crystal disposed therebetween.

16. An image forming apparatus according to claim 15, wherein said liquid crystal is a twisted nematic liquid crystal.

17. An image forming apparatus according to claim 15, wherein said liquid crystal is a birefringence mode liquid crystal.

18. An image forming apparatus according to claim 15, wherein said liquid crystal is a ferroelectric liquid crystal.

19. In an image forming apparatus comprising a light source, a photosensitive member, and a shutter array disposed between the light source and the photosensitive member comprising microshutters arranged in a plurality of rows and a plurality of columns so that light rays emitted from the light source are switched by the action of the microshutters corresponding to an information signal so as to provide an optical signal to be irradiated onto the photosensitive member; the improvement comprising means for applying information signals in parallel to at least one row of microshutters among the plurality of rows, transfer means for transferring the information signals in parallel to a subsequent row of microshutters, a first capacitor formed by the shutter electrode and the counter electrode of a microshutter and a liquid crystal disposed between the electrodes, a second capacitor connected in parallel with first capacitor and means for moving the photosensitive member in synchronism with the rate of the successive transfer of the information signals.

20. An image forming apparatus according to claim 19, wherein said second capacitor is provided to each microshutter.

21. An image forming apparatus according to claim 19, wherein said second capacitor is formed by the shutter electrode formed on a substrate, a counter electrode formed on the substrate, and an insulating film disposed between the electrodes.

22. An image forming apparatus according to claim 21, wherein said insulating film comprises an amorphous silicon nitride film.

23. An image forming apparatus according to claim 19, which further comprises moving means for moving the photosensitive member in synchronism with the transfer of information signals between the rows.

24. An image forming apparatus according to claim 19, wherein said liquid crystal is a twisted nematic liquid crystal.

25. An image forming apparatus according to claim 19, wherein said liquid crystal is a birefringence mode liquid crystal.

26. An image forming apparatus according to claim 19, wherein said liquid crystal is a ferroelectric liquid crystal.

27. In an image forming apparatus comprising a light source, a photosensitive member, and a shutter array disposed between the light source and the photosensitive member and comprising microshutters arranged in a plurality of rows and a plurality of columns so that light rays emitted from the light source are switched by the action of the microshutters corresponding to an information signal so as to provide an optical signal to be irradiated onto the photosensitive member; the improvement comprising a driving circuit for supplying information signals in parallel to a first row among said plurality of rows of microshutters, a transfer circuit for successively transferring the information signals in parallel to a second, a third,...and an n-th row of microshutters, wherein said microshutters first and second capacitors connected in parallel with each other, and means for moving the photosensitive member in synchronism with the rate of the successive transfer of the information signals.

28. An image forming apparatus according to claim 27, wherein said first capacitor and said second capacitor are provided to each microshutter.

29. An image forming apparatus according to claim 27, wherein said first capacitor is formed by the shutter electrode and the counter electrode of a microshutter and a liquid crystal disposed between the electrodes, and said second capacitor is formed by the shutter electrode formed on a substrate, a counter electrode formed on the substrate, and an insulating film disposed between the electrodes.

30. An image forming apparatus according to claim 27, wherein said driving circuit comprises thin film transistors each connected to one microshutter on the first row through the drain thereof.

31. An image forming apparatus according to claim 27, wherein said driving circuit comprises thin film transistors each connected to one microshutter on the first row through the drain thereof, the microshutters on each of the other rows are respectively connected to a thin film transistor, and a pair of microshutters belonging to neighboring rows are connected to the drain and the source, respectively, of a thin film transistor.

32. An image forming apparatus according to claim 27, wherein said driving circuit comprises driving thin film transistors each connected to one microshutter on the first row through the drain thereof, the microshutters on each of the other rows are respectively connected to a transfer thin film transistor, and a pair of microshutters belonging to neighboring rows are connected to the drain and the source, respectively, of a transfer thin film transistor; said image forming apparatus further comprising means for supplying a first clock pulse commonly to the gates of the driving thin film transistors and the transfer thin film transistors on an odd-numbered row and means for supplying a second clock pulse commonly to the gates of the transfer thin film transistors on an even-numbered row.

33. An image forming apparatus according to claim 27, wherein the microshutters on a row are charged in advance and then information signals are transferred to the microshutters on the row for writing in the row.

34. An image forming apparatus according to claim 27, wherein said driving thin film transistors and the transfer thin film transistors on an odd numbered row are driven in synchronism with each other.

35. An image forming apparatus according to claim 27, wherein said liquid crystal is a twisted nematic liquid crystal.

36. An image forming apparatus according to claim 27, wherein said liquid crystal is a birefringence mode liquid crystal.

37. An image forming apparatus according to claim 27, wherein said liquid crystal is a ferroelectric liquid crystal.

38. In an image forming apparatus comprising a light source, a photosensitive member, and a shutter array disposed between the light source and the photosensitive member comprising microshutters arranged in a plurality of rows and a plurality of columns so that light rays emitted from the light source are switched by the action of the microshutters corresponding to an information signal so as to provide an optical signal to be irradiated onto the photosensitive member; the improvement comprising means for applying information signals to at least one row of microshutters among the plurality of rows to form optical signal data on said at least one row, means for transferring said optical signal data to a subsequent row of microshutters, and means for moving the photosensitive member in synchronism with the rates of the successive transfer of said optical signal data.

39. An image forming apparatus according to claim 38 wherein each of said microshutters comprises a pair of opposite electrodes and a ferroelectric liquid crystal disposed therebetween.

* * * * *

UNITED STATES PATENT AND TRADEMARK OFFICE
CERTIFICATE OF CORRECTION

PATENT NO. : 4,838,652
DATED : June 13, 1989
INVENTOR(S) : YUTAKA INABA ET AL.

Page 1 of 3

It is certified that error appears in the above-identified patent and that said Letters Patent is hereby corrected as shown below:

AT [56] REFERENCES CITED

Attorney, Agent, or Firm, "Fitzpatrtick, Cella, Harper & Scinto" should read --Fitzpatrick, Cella, Harper & Scinto--.

COLUMN 1

Line 19, "No. 4548476" should read --No. 4,548,476-- and "U.S. Pat. No. 4569574" should read --U. S. Pat. No. 4,569,574--.
    Line 28, "of" should be deleted.
    Line 29, "of" should be deleted.
    Line 53, "rows" should read --rows,--.

COLUMN 2

Line 34, "TFTs 15a, 16a," should read --TFTs 15a,16a,...,--.

COLUMN 3

Line 6, "anL" should read --an L--.
    Line 11, "arc" should read --are--.

COLUMN 5

Line 47, "of" should be deleted.
    Line 51, "an" should read --on--.

UNITED STATES PATENT AND TRADEMARK OFFICE
CERTIFICATE OF CORRECTION

PATENT NO. : 4,838,652

DATED : June 13, 1989

INVENTOR(S) : YUTAKA INABA ET AL.                Page 2 of 3

It is certified that error appears in the above-identified patent and that said Letters Patent is hereby corrected as shown below:

COLUMN 6

Line 34, "($\epsilon$en)" should read --($\epsilon$n)--.
    Line 60, "row" should read --rows--.

COLUMN 7

Line 66, "and" should be deleted.

COLUMN 9

Line 8, "first capacitor" should read --the first capacitor--.
    Line 39, "and" should be deleted.
    Line 50, "microshutters first" should read --microshutters comprises first--.

UNITED STATES PATENT AND TRADEMARK OFFICE
CERTIFICATE OF CORRECTION

PATENT NO. : 4,838,652

DATED : June 13, 1989

INVENTOR(S) : YUTAKA INABA ET AL.   Page 3 of 3

It is certified that error appears in the above-identified patent and that said Letters Patent is hereby corrected as shown below:

COLUMN 10

Line 34, "odd numbered" should read --odd-numbered--.
Line 63, "38" should read --38,--.

Signed and Sealed this

Twenty-second Day of May, 1990

Attest:

HARRY F. MANBECK, JR.

*Attesting Officer*   *Commissioner of Patents and Trademarks*